US009401076B2

(12) United States Patent
Nakamura

(10) Patent No.: US 9,401,076 B2
(45) **Date of Patent: *Jul. 26, 2016**

(54) GAME MACHINE, METHOD OF CONTROLLING COMPUTER, AND STORAGE MEDIUM

(71) Applicant: Konami Gaming, Inc., Las Vegas, NV (US)

(72) Inventor: Daisuke Nakamura, Zama (JP)

(73) Assignee: KONAMI GAMING, INC., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/801,487

(22) Filed: Jul. 16, 2015

(65) Prior Publication Data

US 2015/0325088 A1 Nov. 12, 2015

Related U.S. Application Data

(63) Continuation of application No. 13/686,233, filed on Nov. 27, 2012, now Pat. No. 9,117,333.

(30) Foreign Application Priority Data

Dec. 5, 2011 (AU) ................................ 2011253830

(51) Int. Cl.
*G06F 17/00* (2006.01)
*G06F 19/00* (2011.01)
(Continued)

(52) U.S. Cl.
CPC ................ *G07F 17/34* (2013.01); *G07F 17/32* (2013.01); *G07F 17/326* (2013.01); *G07F 17/3213* (2013.01); *G07F 17/3267* (2013.01); *G07F 17/329* (2013.01)

(58) Field of Classification Search
CPC ... G07F 17/32; G07F 17/3211; G07F 17/326; G07F 17/3262; G07F 17/3265; G07F 17/3267; G07F 17/3286; G07F 17/3244; G07F 17/34
See application file for complete search history.

(56) References Cited

U.S. PATENT DOCUMENTS 6,464,581 B1 * 10/2002 Yoseloff ................ A63F 13/005 273/138.2
7,744,455 B2 6/2010 Aida
(Continued)

OTHER PUBLICATIONS

Examiner's First Report on Australian Patent Application No. 2011253830 (dated Feb. 22, 2012).
(Continued)

*Primary Examiner* — Milap Shah
(74) *Attorney, Agent, or Firm* — Howard & Howard Attorneys PLLC

(57) ABSTRACT

A game machine uses a lottery region containing the cells, provides a game opportunity that changes symbols on the cells by causing the symbols of a symbol group to appear on the portion of the cells, determines by lottery, at least a portion of the symbols which should constitute the symbol group, causes at least the portion of the symbols constituting the symbol group to appear in the lottery region based on a lottery result so as to change at least the portion of the symbols arranged on the cells by moving the symbol group including the symbol determined by the lottery result on a movement path containing two directions and stopping the symbol group so that at least the portion of the symbols of the symbol group is arranged on the cells, and determines a prize winning based on the symbols arranged on the cells by the symbol group.

16 Claims, 14 Drawing Sheets

(51) Int. Cl.

| | |
|---|---|
| ***G07F 17/34*** | (2006.01) |
| ***G07F 17/32*** | (2006.01) |

(56) References Cited

U.S. PATENT DOCUMENTS

| | | | | |
|---|---|---|---|---|
| 7,794,320 | B2 | 9/2010 | Baerlocher et al. | |
| 8,628,402 | B2 | 1/2014 | Nakamura | |
| 9,117,333 | B2 * | 8/2015 | Nakamura | G07F 17/32 |
| 2002/0198039 | A1 | 12/2002 | Marks et al. | |
| 2003/0216165 | A1 | 11/2003 | Singer et al. | |
| 2004/0033827 | A1 * | 2/2004 | Gilmore | G07F 17/32 463/20 |
| 2004/0048646 | A1 | 3/2004 | Visocnik | |
| 2004/0106444 | A1 * | 6/2004 | Cuddy | G07F 17/3244 463/16 |
| 2005/0054434 | A1 | 3/2005 | Baerlocher et al. | |
| 2005/0192085 | A1 | 9/2005 | Iwamoto | |
| 2006/0030387 | A1 | 2/2006 | Jackson | |
| 2006/0058097 | A1 | 3/2006 | Berman et al. | |
| 2007/0287529 | A1 | 12/2007 | Kojima | |
| 2008/0058082 | A1 | 3/2008 | Kido | |
| 2008/0064466 | A1 | 3/2008 | Saito | |
| 2008/0108411 | A1 | 5/2008 | Jensen et al. | |
| 2008/0167114 | A1 | 7/2008 | Graham | |
| 2008/0287178 | A1 | 11/2008 | Berman et al. | |
| 2009/0075722 | A1 | 3/2009 | Louie et al. | |
| 2009/0203435 | A1 | 8/2009 | Yoshizawa | |
| 2009/0312086 | A1 | 12/2009 | Kanellos et al. | |
| 2010/0113129 | A1 | 5/2010 | Nakamura | |
| 2010/0124972 | A1 | 5/2010 | Rodgers et al. | |
| 2010/0279760 | A1 | 11/2010 | Sugiyama | |

OTHER PUBLICATIONS

Patent Examination Report No. 2 on Australian Patent Application No. 2011253830 (dated Dec. 21, 2012).

* cited by examiner

GAME MACHINE, METHOD OF CONTROLLING COMPUTER, AND STORAGE MEDIUM

CROSS REFERENCE TO RELATED APPLICATION

This application is a continuation of U.S. patent application Ser. No. 13/686,233, filed Nov. 27, 2012, which claims priority to Australian Patent Application No. 2011253830, filed Dec. 5, 2011, the disclosures of which are hereby incorporated by reference in their entirety.

BACKGROUND OF THE INVENTION

1. Field of the Invention

The present invention relates to a game machine etc. providing a game opportunity that uses a lottery region containing a plurality of cells as positions where the symbols should be arranged, and changes the symbols to be arranged on each cell.

2. Description of the Related Art

There exist game machines that provide a game opportunity in which a plurality of cells is arranged so that a predetermined number of rows and a predetermined number of columns form a shape of a matrix, and in which a benefit is offered when each symbol arranged in each cell forms a prize winning pattern. As one of such game machines, there is known a game machine in which each symbol moves on a path containing a curve or the like and is arranged on each cell (see, for example, U.S. Pat. No. 7,744,455). Also, as one of game machines which use symbol columns arranged on each of cell columns, and change each symbol arranged on each cell by moving these symbol columns along the each cell column and stopping the movement, there is also known a game machine which determines each symbol constituting the symbol column by lottery (see, for example, U.S Pub. No. US2010/0113129).

SUMMARY OF THE INVENTION

In a game machine according to U.S. Pat. No. 7,744,455, it is tried to achieve prevention of the player's boredom by changing the path before the symbols are arranged on each cell. However, in such a game machine, the symbols arranged on each cell are determined by lottery in same probability. Therefore, an expectation of the player is equalized. In contrast, in the game machine according to U.S. Pub. No. US2010/0113129, there can be caused a bias to an expectation for the symbol arranged on each cell since each symbol constituting the symbol column is determined by lottery. However, the symbol column merely moves in one direction after the symbols constituting the symbol column have been determined by lottery. Therefore, it is easy to predict the symbol which may be arranged on each cell. That is, there is room to further utilize the bias to an expectation caused by lottery.

Thus, an object of the present invention is to provide a game machine which can make a prediction of a game result more difficult, a method of controlling a computer, and a storage medium.

In order to solve the above problems, a game machine according to the present invention is a game machine using a lottery region containing cells as positions where symbols should be arranged, and providing a game opportunity that changes at least a portion of the symbols arranged on the cells by causing at least a portion of symbols of a symbol group to appear on at least a portion of the cells, wherein the game machine comprises: a symbol lottery device that determines by lottery, at least a portion of the symbols which should constitute the symbol group; a symbol arrangement control device that causes at least the portion of the symbols constituting the symbol group to appear in the lottery region based on a lottery result of the symbol lottery device so as to change at least the portion of the symbols arranged on the cells by moving the symbol group including the symbol determined by the lottery result along the cells on a movement path containing two directions and stopping the symbol group so that at least the portion of the symbols of the symbol group is arranged on the cells; and a prize winning determination device that determines whether a combination of the symbols arranged on a cell group of a determination target forms a prize winning pattern based on the symbols arranged on the cells by the symbol group.

According to the present invention, the symbol group moves along each cell on the movement path containing two directions. That is, the symbol group changes the direction at least once. Therefore, it is difficult to predict the cell on which the symbol is finally arranged by symbol group. Thus, it is possible to betray the prediction relevant to the cell on which the symbol is finally arranged by symbol group. Also, at least the portion of the symbols constituting the symbol group is determined by lottery. That is, it is difficult to predict each symbol constituting the symbol group in advance. Therefore, the prediction what kind of symbols are finally arranged by the symbol group can be made more difficult. Further, the bias to an expectation for the symbol arranged on each cell can be caused. Herewith, the prediction of the game result can be made more difficult.

Also, in order to solve the above problems, a method of controlling a computer according to the present invention is a method of controlling a computer of a game machine using a lottery region containing cells as positions where symbols should be arranged, and providing a game opportunity that changes at least a portion of the symbols arranged on the cells by causing at least a portion of symbols of a symbol group to appear on at least a portion of the cells, the game machine including a display device and the computer that controls a display of the display device, wherein the method of controlling the computer comprises the steps; a symbol lottery step that determines by lottery, at least a portion of the symbols which should constitute the symbol group; a symbol arrangement control step that causes at least the portion of the symbols constituting the symbol group to appear in the lottery region based on a lottery result of the symbol lottery step so as to change at least the portion of the symbols arranged on the cells by moving the symbol group including the symbol determined by the lottery result along the cells on a movement path containing two directions and stopping the symbol group so that at least the portion of the symbols of the symbol group is arranged on the cells; and a prize winning determination step that determines whether a combination of the symbols arranged on a cell group of a determination target forms a prize winning pattern based on the symbols arranged on the cells by the symbol group.

Also, in order to solve the above problems, a non-transitory computer readable storage medium according to the present invention stores a computer program for a game machine using a lottery region containing cells as positions where symbols should be arranged, and providing a game opportunity that changes at least a portion of the symbols arranged on the cells by causing at least a portion of symbols of a symbol group to appear on at least a portion of the cells, the game machine including a display device and the computer that controls a display of the display device, wherein the computer program is configured to make the computer serve as: a symbol lottery device that determines by lottery, at least a portion of the symbols which should constitute the symbol group; a symbol arrangement control device that causes at least the portion of the symbols constituting the symbol group to appear in the lottery region based on a lottery result of the symbol lottery device so as to change at least the portion of the symbols arranged on the cells by moving the symbol group including the symbol determined by the lottery result along the cells on a movement path containing two directions and stopping the symbol group so that at least the portion of the symbols of the symbol group is arranged on the cells; and a prize winning determination device that determines whether a combination of the symbols arranged on a cell group of a determination target forms a prize winning pattern based on the symbols arranged on the cells by the symbol group. By executing the method of controlling the computer or the computer program stored in the storage medium of the present invention, it is possible to realize the game machine of the present invention.

DETAILED DESCRIPTION OF EMBODIMENTS

Figure 1:
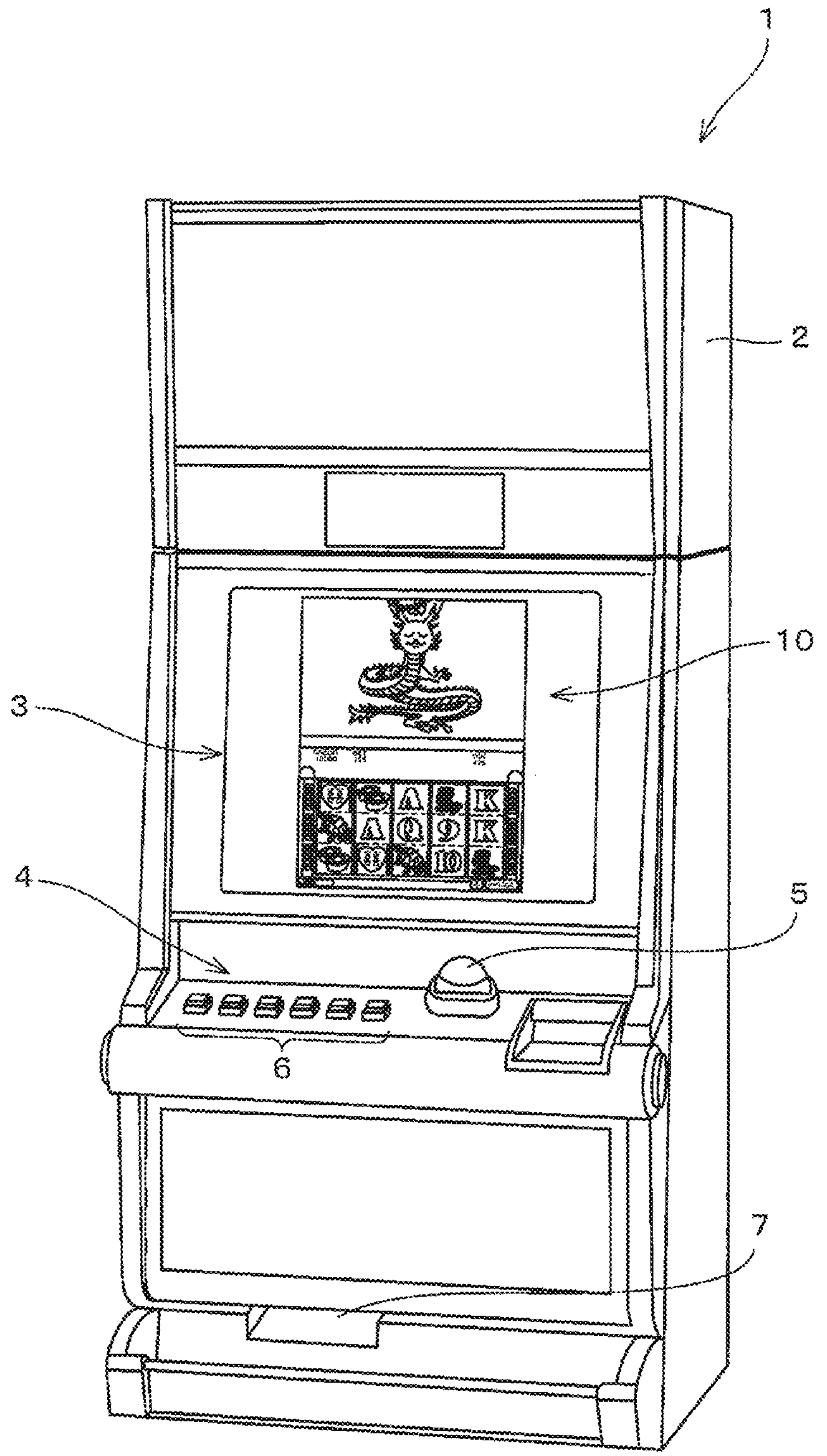
FIG. 1 is an external view of a game machine according to an embodiment of the present invention.

Hereinafter, a game machine according to an embodiment of the present invention will be described with reference to the drawings. FIG. 1 is an external view of a game machine according to an embodiment of the invention. The game machine 1 is configured as a game machine of a slot machine type. As illustrated in FIG. 1, the game machine 1 has a chassis 2. On a front surface of the chassis 2, there is provided a display device 3. For example, a liquid crystal display device is applied as the display device 3.

A control panel 4 is provided below the display device 3. A slot 5 of coins and an operation device 6 are provided on the control panel 4. The operation device 6 includes operation members for performing various operations such as betting operation or the like. Also, a payout port 7 of the coins is provided below the control panel 4.

Figure 2:
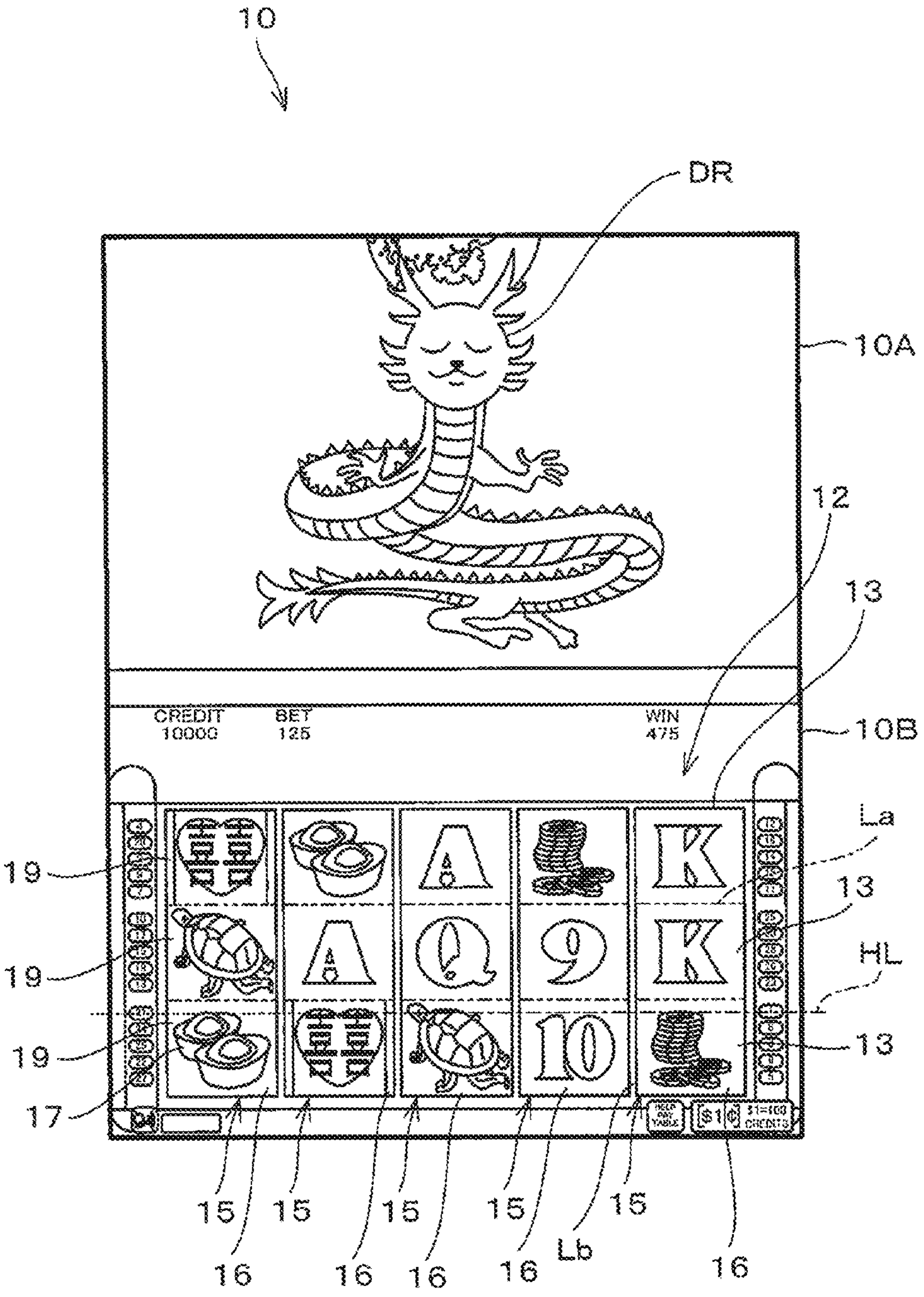
FIG. 2 is a schematic view illustrating an example of a game screen.

In the game machine 1, a slot game is provided as a game opportunity in exchange for consumption of a predetermined value. In the display device 3, there is displayed a game screen 10 used by the slot game. FIG. 2 is a schematic view illustrating an example of the game screen 10. As illustrated in FIG. 2, the game screen 10 includes a first game region 10A and a second game region 10B. The first game region 10A is used for staging of the game etc. In the example of FIG. 2, a dragon DR is displayed near the center of the first game region 10A as a character used for staging of the game. As an example of staging of the game, the dragon DR is used for staging of a bonus game during the game. More specifically, the dragon DR functions as a bonus reel during a bonus game. Details of the bonus game will be described later.

In contrast, the second game region 10B is used for executing the slot game. As illustrated in FIG. 2, the second game region 10B includes a lottery region 12. In the lottery region 12, cells 13 are arranged in a predetermined arrangement (predetermined positional relationship). Specifically, as the predetermined arrangement, the cells 13 are located so as to be arranged in a matrix in longitudinal and transverse directions on a screen of the display device 3. In the example in FIG. 2, virtual lines La that separate the cells 13 arranged in the longitudinal direction are shown by the two-dot chain lines. In addition, in an actual game screen 10, the virtual lines La will not be displayed.

In contrast, the cells 13 arranged in the transverse direction are separated by separating lines Lb. In the example in FIG. 2, there are arranged 3 rows of the cells 13 in the longitudinal direction and 5 columns of the cells 13 in the transverse direction, in total 15 cells 13. One cell column 15 is configured by the cells 13 arranged linearly in the longitudinal direction. Accordingly, in the lottery region 12, five cell columns 15 are arranged so as to be parallel to each other in the transverse direction. In addition, the virtual lines La and the separating lines Lb in the FIG. 2, that is, the boundary lines for separating the cells 13 may be displayed according to an aspect where a player can visually recognize the lines, or may not be displayed.

The individual cell columns 15 correspond to five virtual reels 16 which are serves as symbol columns. In the lottery region 12, there is displayed only a portion of each virtual reel 16 that overlaps the lottery region 12. The virtual reels 16 are configured by predetermined number of symbol regions 19 which are arranged in one direction. The total length of the virtual reel 16 is sufficiently longer than that of the cell column 15. The size of one symbol region 19 is the same as that of the cell 13.

In each symbol region 19 which is included in the virtual reel 16, any one of kinds of symbols 17 is fixedly disposed. As one example of the symbol 17, a numeral, a character, or a figure such as a turtle, hats, or coins is appropriately adopted. In addition, the number of symbol regions 19 that are included in the virtual reel 16 may be appropriately determined. Also, the arrangement of the symbols 17 in each of the five reels 16 may be the same with or be different from each other.

An arrangement direction of each cell 13 included in the cell column 15 in the lottery region 12 is matched with an arrangement direction of symbols 17 in the virtual reel 16. In the lottery region 16, one symbol 17 on the virtual reel 16 is displayed to be allocated to one cell 13. In addition, ideally, the virtual reel 16 is configured in a cylindrical shape, similar to a mechanical reel that symbols are arranged on an outer circumference of a cylindrical body.

If a game starts, the virtual reel 16 is scrolled from top to the bottom along the sell column 15. The scrolling is performed so as to virtually represent the movement of the symbols when a physical reel rotates by replacing the movement by image display. At predetermined stop time, each virtual reel 16 stops so that one symbol 17 appears in one cell 13. That is, a stop position of the scroll of the virtual reel 16 (which may be simply called a stop position of the virtual reel 16) is controlled in one cell unit. And, the virtual reel 16 changes the symbol 17 appearing on each cell 13 by the scroll and the stop.

Figure 3:
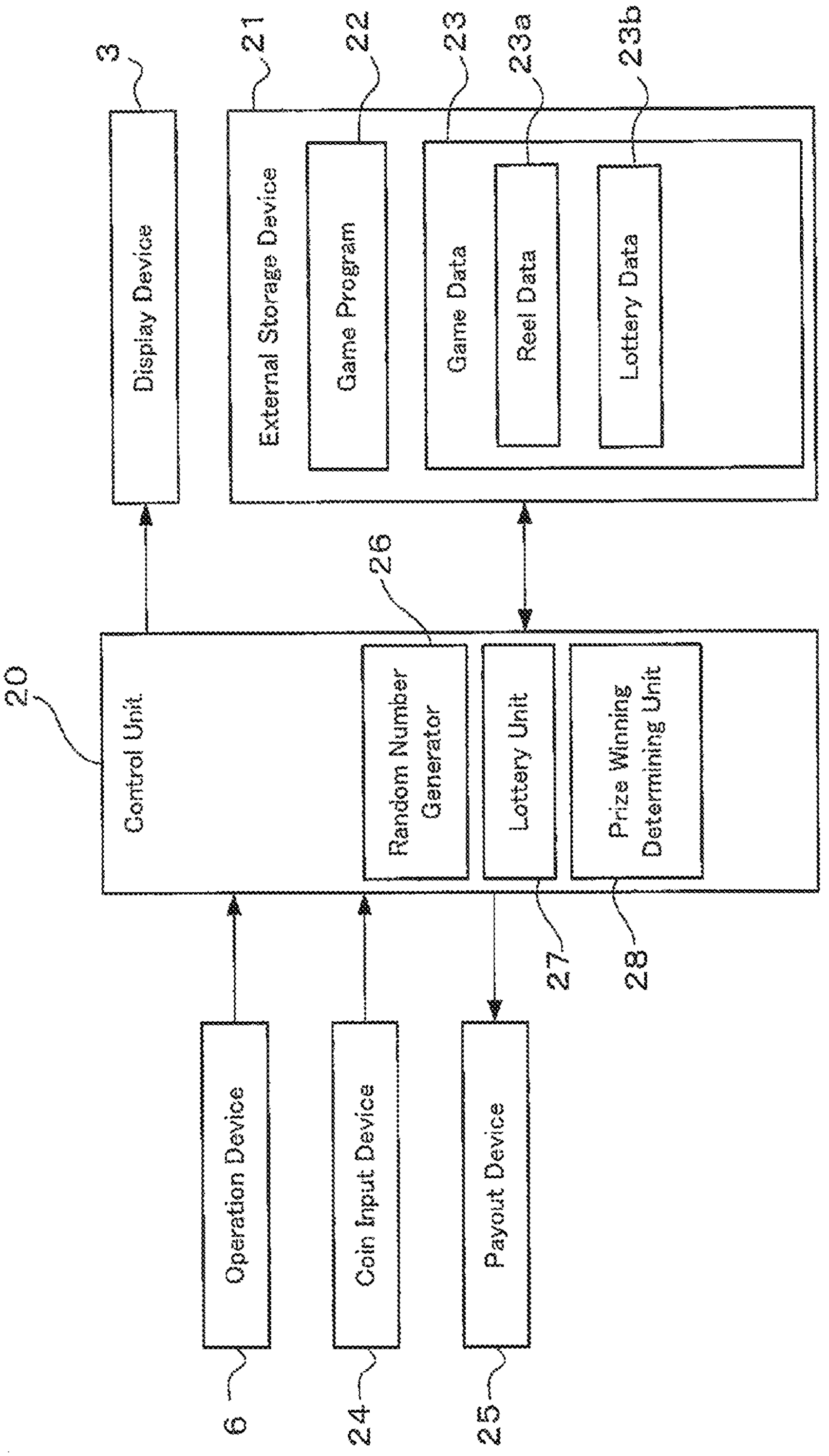
FIG. 3 is a functional block diagram of the game machine.

The configuration of the game machine 1 will be further described with reference to the FIG. 3. FIG. 3 is a functional block diagram of the game machine. As illustrated in FIG. 3, a control unit 20 is provided inside the chassis 2 of the game machine 1. The control unit 20 is configured as a computer unit including a microprocessor and other peripheral devices, such as a main storage device needed for the operation thereof and the like. An external storage device 21 is connected to the control unit 20.

As the external storage device 21, there is used a storage medium which is capable of holding storage without feeding of power, for example, magnetic storage medium, an optical storage medium such as a DVD-ROM and a CD-ROM, or a nonvolatile semi conductor memory device such as an EEPROM.

The external storage device 21 stores a game program 22 and a game data 23. The game program 22 is a program that is needed to cause the game machine 1 to execute a game. The game data 23 is various kinds of data that is used when the game program 22 is executed. The game program 22 is appropriately read and is executed by the control unit 20. Also, the game date 23 is appropriately read and is referred by the control unit 20.

The game data 23 includes a reel data 23*a* and a lottery data 23*b*. The reel data 23*a* is data describing the type of the symbol 17 of each symbol region 19 on the virtual reel 16. The lottery data 23*b* is used to cause a bonus reel as a symbol group used by a bonus game to appear. More specifically, the lottery data 23*b* is used when each symbol 17 to be arranged in bonus reel is determined by a lottery. Details of the lottery data 23*b* will be described later. In addition, the game program 22 includes various program modules needed to play a game, however an illustration thereof is omitted. Similarly, the game data 23 also includes various kinds of data such as sound effect data and dividend data, however an illustration thereof is omitted.

The operation device 6 and the display device 3 described above are connected to the control unit 20. The operation device 6 outputs a signal in accordance with a player's operation to the control unit 20. The display device 3 displays an image in accordance with an image signal output from the control unit 20. The control unit 20 executes the game in a predetermined procedure according to the game program 22 by referring to an output signal from the operation device 6. Accordingly, the control unit 20 causes the display device 3 to display a game screen in accordance with a situation of the game. The game screen includes, for example, an image showing the above lottery region 12, images of a portion that should be caused to appear in the lottery region 12 (that is, the symbol 17 that should be caused to appear in each of the cells 13) of the virtual reels 16, and an image of the bonus reel.

As an input device or an output device that is needed to execute the game, a coin input device 24 and a payout device 25 are further connected to the control unit 20. The coin input device 24 receives a deposit of coins as a value for playing a game through the slot 5 of coins. And, the coin input device 24 outputs a signal according to a deposit amount of coins to the control unit 20.

The payout device 25 executes a payment of coins as a dividend of the game to the player according to an instruction from the control unit 20. The payment of coins is executed through the payout port 7. In addition, receiving the value for playing the game and the dividend to the player are not limited to coins. For example, as alternative currency, medals, tokens or the like may be used. Also, a right to play the game may be used. The right to play the game is quantitatively expressed in a unit referred to as a credit. Or, a settlement method that enables an exchange of a game value (including a currency value) through an exchange of electronic information such as an electronic currency or the like may be used. In this case, an information communication device that exchanges the electronic information mutually, a storage medium that stores information which is exchanged, or the like may be used instead of the slot 5 of coins and the payout port 7.

In the control unit 20, there are provided a random number generator 26, a lottery unit 27, and a prize winning determining unit 28. The random number generator 26 generates random numbers of a predetermined digit numbers. The random number generator 26 is a logical device that is realized by a combination of a microprocessor and software. In addition, the random number generator 26 may be a physical device where is combined with electronic circuits.

The lottery unit 27 acquires random numbers from the random number generator 26 and chooses the stop position of the virtual reel 16 by a lottery. The prize winning determining unit 28 determines whether or not the prize winning is present, when the virtual reels 16 are stopped. Also, the prize winning determining unit 28 determines whether or not a bonus condition for generating the bonus game is met. The lottery unit 27 and the prize winning determining unit 28 are logical devices that are realized by a combination of the microprocessor and the software. In the control unit 20, there are appropriately provided other logical devices or physical devices that are needed to execute a slot game, however they are not illustrated in the drawings.

Next, the slot game played by the game machine 1 will further be described. More specifically, details of the bonus game that can be generated during the slot game will be described with reference to FIGS. 4 to 8. The game machine 1 provides the slot game in exchange for consumption of coins of the predetermined value. Specifically, when a signal indicating that coins of the amount necessary for a game have been put in is output from the coin input device 24 to the control unit 20, a bet operation via the operation device 6 is enabled. Then, when coins of a suitable amount are bet by the bet operation, the slot game is provided through the game screen 10 (see FIG. 2).

When the slot game is started, as described above, the virtual reel 16 is scrolled and then stops in such a way that one symbol 17 appears in one cell 13. Also, for example, as illustrated by a one-dot chain line in FIG. 2, a prize-winning determination line HL is set in the lottery region 12 in accordance with the bet amount. The prize-winning determination line HL is set, for example, so that the number increase with increasing bet amount. The prize-winning determination line HL is formed by binding target cell groups used to determine whether or not any prize is won. And, if a prize-winning pattern is formed by each symbol 17 on the prize-winning determination line HL when scrolling stops, a dividend is paid as a benefit. For example, as a prize-winning pattern, there is adopted a pattern in which the same symbol 17 is continuously arranged at three cells on the prize-winning determination line HL. In addition, the cell group of a determination target is not limited to the prize-winning determination line HL forming a straight line. As the cell group of the determination target, there is adopted various embodiments such as each cell included in a curved prize-winning determination line, every other cell or the like.

On the other hand, if a bonus condition is met during the game, a bonus game occurs. For example, the bonus condition is met if a predetermined bonus pattern is formed by each symbol 17 on the prize-winning determination line HL. Also, as the bonus pattern, for example, a prize-winning pattern formed by the specific symbol 17 is adopted. In addition, a pattern that is different from the prize-winning pattern may be adopted as the bonus pattern. Further, in addition to the bonus pattern, for example, game conditions such as a predetermined number of play times or the like may be adopted as the bonus condition.

Figure 4:
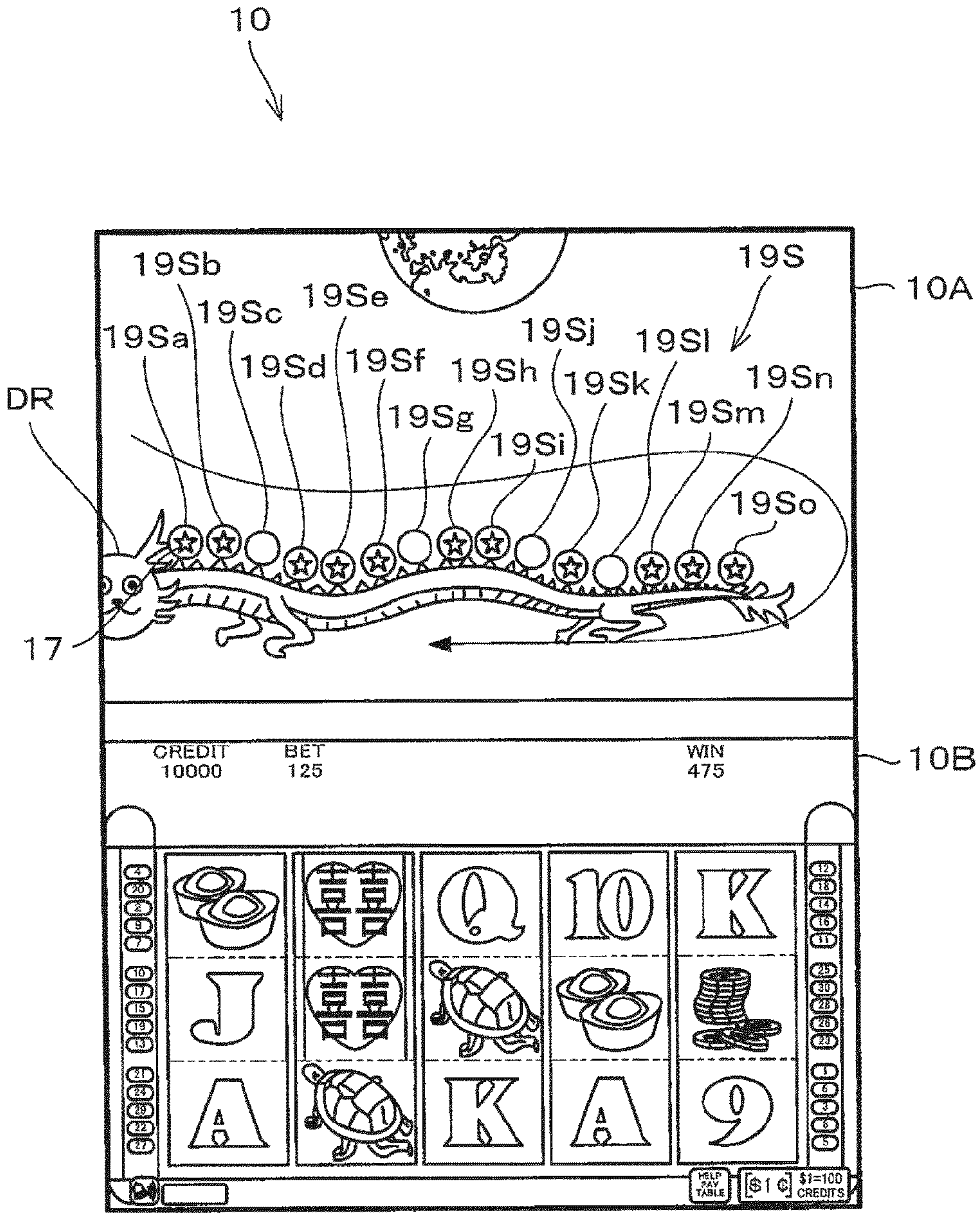
FIG. 4 is a diagram illustrating an example of the game screen when a bonus game occurs.

FIG. 4 is a diagram illustrating an example of the game screen 10 when the bonus game occurs. As illustrated in FIG. 4, when the bonus game occurs, the dragon DR in the first game region 10A starts to move toward the second game region 10B. Moreover, a special symbol region 19S is arranged on the back of the dragon DR. The special symbol region 19S is classified into a region in which each symbol 17 is arranged and a region in a blank state in which none of the symbols 17 is arranged. In the example of FIG. 4, the 15 special symbol regions 19S corresponding to the number of the cells 13 included in the lottery region 12 are arranged on the back of the dragon DR. Also, the symbol 17 is not arranged in each of special symbol regions 19Sc, 19Sg, 19Sj, 19Sl in the third, seventh, tenth, and twelfth positions from the head of the dragon DR. That is, the special symbol regions 19Sc, 19Sg, 19Sj, 19Sl in these positions are in a blank state. And, a star figure "☆" is arranged as the symbol 17 in special symbol regions 19Sa, 19Sb, 19Sd, 19Se, 19Sf, 19Sh, 19Si, 19Sk, 19Sm, 19Sn, 19So in positions other than the above positions. In addition, the positions of the special symbol regions 19S contained in the bonus reel may be fixed. Also, the positions of the special symbol regions 19S may be changed to the back side of the dragon DR, the front side of the dragon DR, or both of them and so on, in accordance with a predetermined condition such as the type of the symbols 17 forming the bonus pattern or a predetermined order. Or, the positions of the special symbol regions 19S may be determined by the lottery. This also applies to the number, the size, or the like of the special symbol regions 19S.

Figure 5:
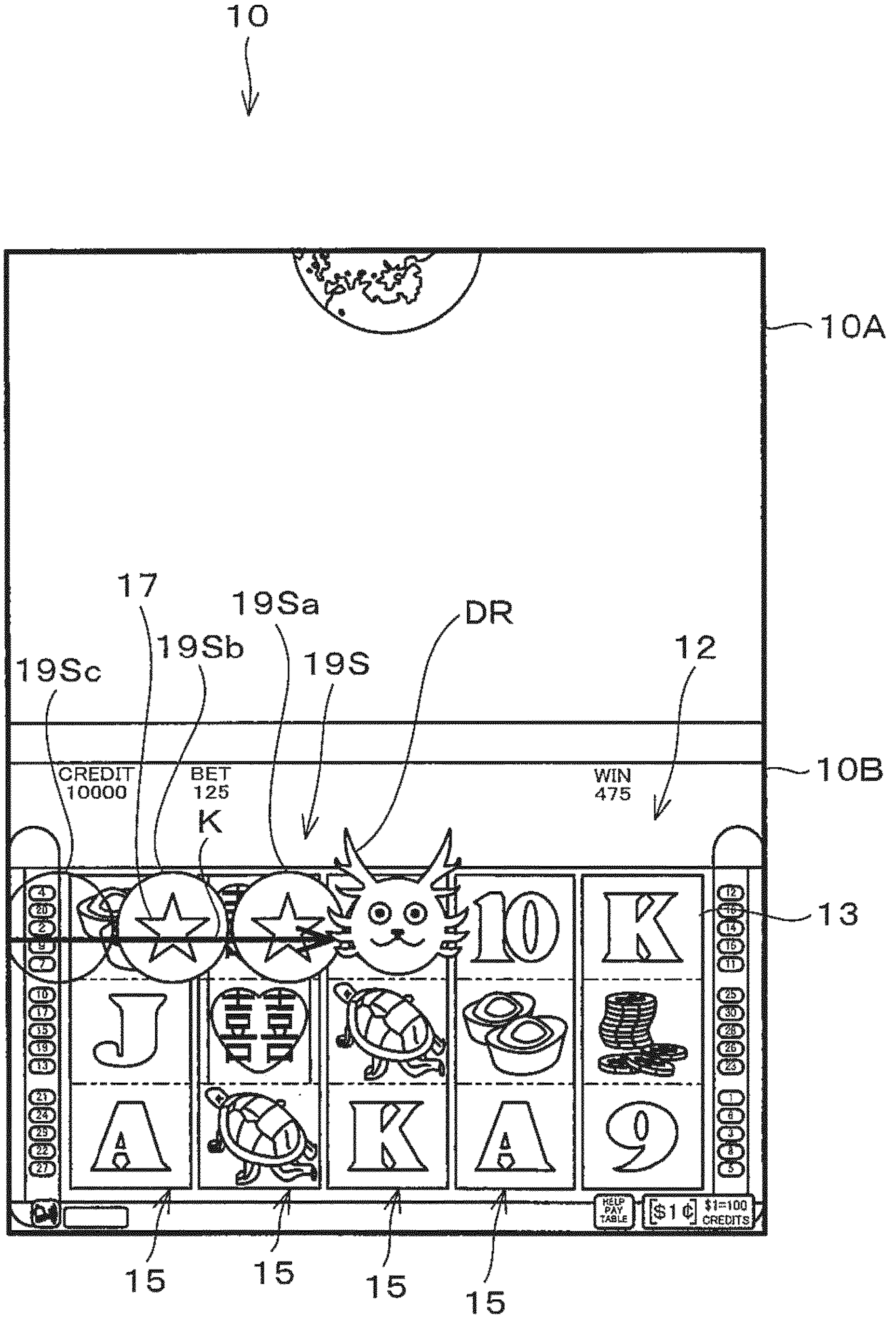
FIG. 5 is a diagram illustrating a game screen after a predetermined time passes from the state in FIG. 4.

FIG. 5 is a diagram illustrating a game screen after a predetermined time passes from the state in FIG. 4. The dragon DR in the first game region 10A once disappears from the game screen 10. Then, the dragon DR reappears in the second game region 10B. The dragon DR that has reappeared in the second game region 10B moves, as illustrated in FIG. 5, along each of the cells 13. In the example of FIG. 5, the dragon DR reappears from the left edge of the second game region 10B and moves in an arrangement direction of cell columns 15 along each of the cells 13 arranged in the top position of the cell columns 15. The display of the back of the dragon DR is omitted, and, the special symbol regions 19S, the symbols 17 arranged therein, and a trajectory K of the movement are displayed.

Figure 6:
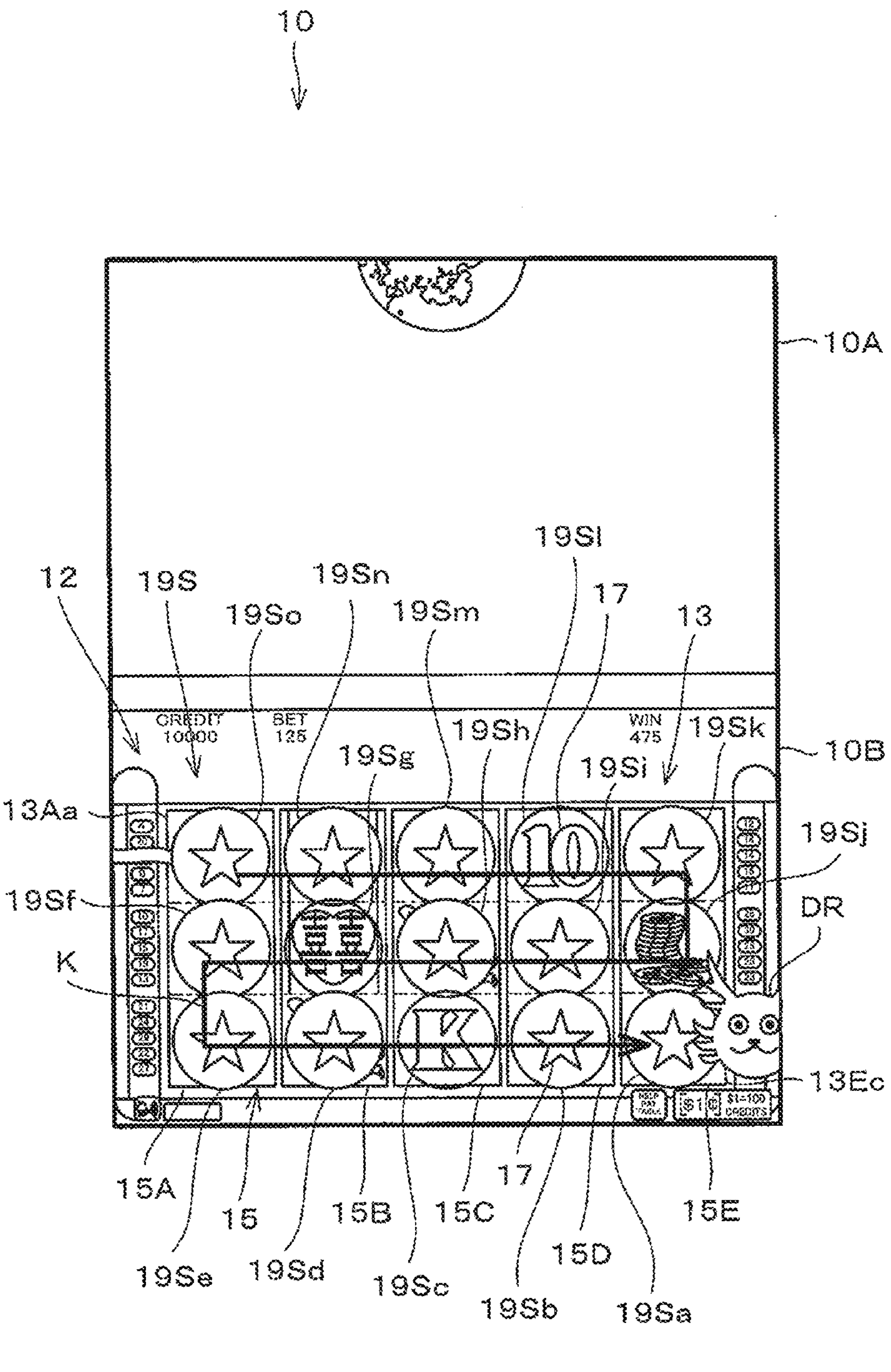
FIG. 6 is a diagram illustrating a game screen after the predetermined time further passes from the state in FIG. 5.

FIG. 6 is a diagram illustrating a game screen after the predetermined time further passes from the state in FIG. 5. As illustrated in FIG. 6, the dragon DR moves along each of the cells 13 so that all the special symbol regions 19S arranged on the back thereof are arranged in each of the cells 13. In the example of FIG. 6, after reappearing on a cell 13Aa in the top position of a cell column 15A at the left edge, the dragon DR moves in the arrangement direction of the cell columns 15 along the cells 13 in the order of each cell 13 in a middle position of the cell columns 15 and each cell 13 in a bottom position. That is, the dragon DR moves in such a way that all the cells 13 in the lottery region 12 are passed while changing direction of the arrangement direction of the cell columns 15 and the arrangement direction of the cells 13. As a result of such movement, there is displayed the trajectory K from the cell 13Aa in the top position of the cell column 15A at the left edge to a cell 13Ec in the bottom position of a cell column 15E at the right edge. And, each special symbol region 19S is arranged in each of the cells 13 on the trajectory K in turn from the cell 13Ec in which the special symbol region 19Sa in the first position is arranged to the cell 13Aa in which the special symbol region 19So in the 15th position is arranged.

Figure 7:
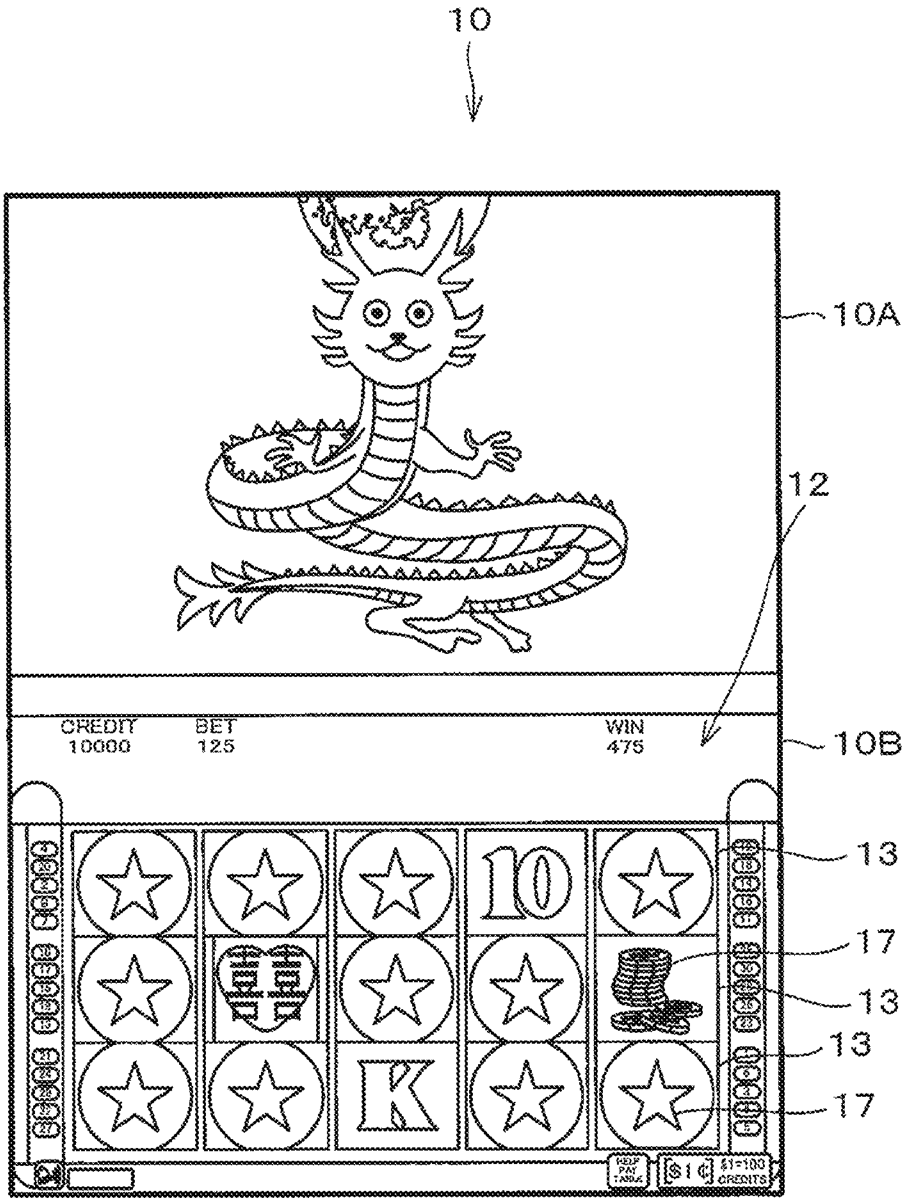
FIG. 7 is a diagram illustrating a game screen after the predetermined time further passes from the state in FIG. 6.

FIG. 7 is a diagram illustrating a game screen after the predetermined time further passes from the state in FIG. 6. As illustrated in FIG. 7, each symbol 17 on each special symbol region 19S stopped in each cell 13 is displayed in each cell 13 on the trajectory K of the dragon DR. That is, the special symbol regions 19S are arranged on the symbol regions 19 displayed in each cell 13 by the stop of scrolling, and each symbol 17 displayed in each cell 13 changes from the symbols 17 of the symbol regions 19 to that of special symbol regions 19S. However, if the special symbol region 19S is in a blank state, the symbols 17 of the symbol regions 19 are displayed unchanged. In the example of FIG. 7, figures etc. (see FIG. 4) of the symbols 17 displayed when the bonus game occurs have changed to the star figures "☆" arranged on the special symbol regions 19S. In the cells 13 corresponding to the special symbol regions 19Sc, 19Sg, 19Sj, 19Sl in the blank state, there are displayed the same symbols 17 at the occurrence time of the bonus game.

When the bonus game occurs, if the prize-winning pattern is formed by the symbols 17 changed by the dragon DR, the benefit is provided. That is, the symbol 17 of each special symbol region 19S arranged in each cell 13 is used for the formation of a prize-winning pattern. Here, the symbol 17 of the star figure "☆" means a wild symbol. That is, this figure functions as any of other figures adopted as the symbol 17. Thus, if a prize-winning pattern containing a predetermined number of the same symbol 17 or more in the cell group of the determination target is adopted, the probability of winning a prize increases by containing this figure in each cell.

Figure 8:
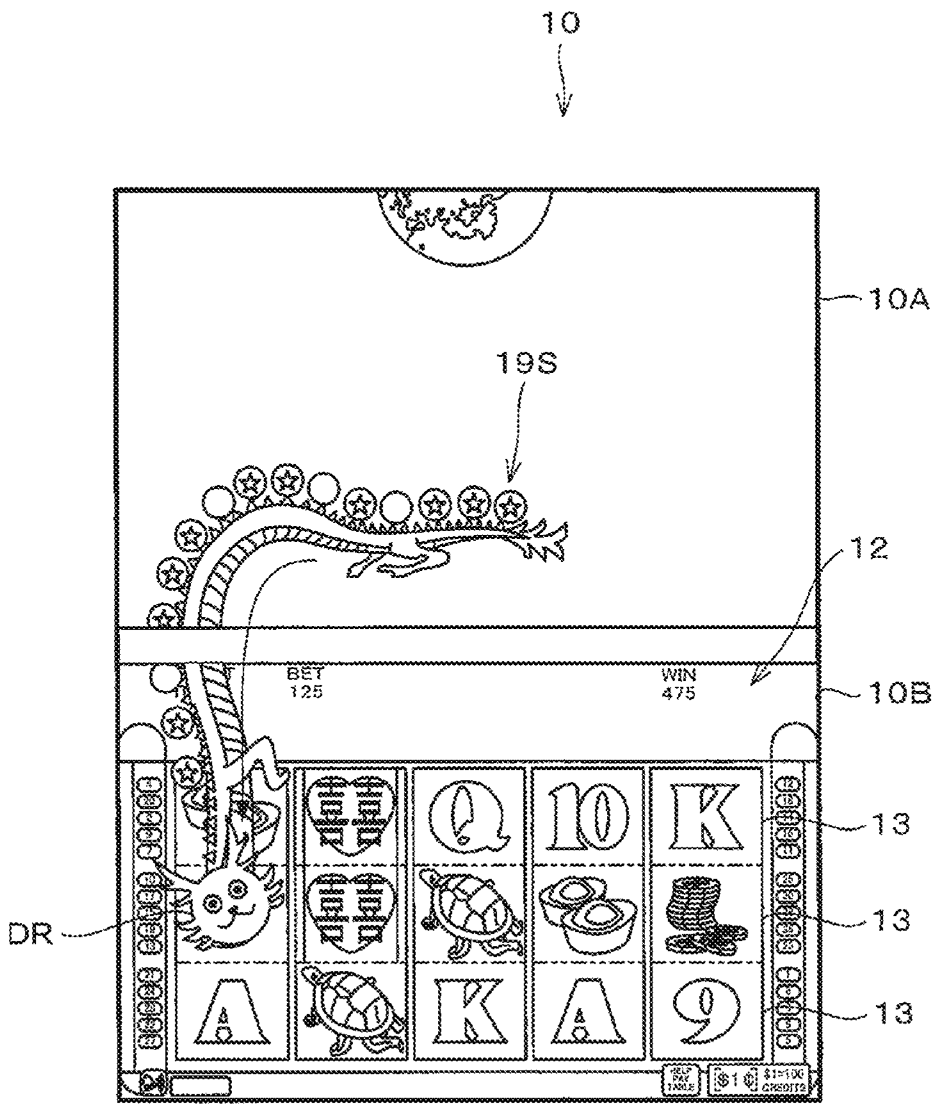
FIG. 8 is a diagram for describing another example of the movement direction of a bonus reel.

In a bonus game, as described above, the dragon DR arranges the special symbol regions 19S in the cells 13. Accordingly, the symbols 17 arranged in the special symbol regions 19S are displayed in each cell 13. That is, in a bonus game, the dragon DR functions as the bonus reel separated from the virtual reel 16 arranged in each of the cell columns 15. The movement direction of the dragon DR is not limited to the embodiment illustrated in FIGS. 4 to 7. FIG. 8 is a diagram for describing another example of the movement direction of a bonus reel (dragon DR). As illustrated in FIG. 8, the dragon DR moves on each of the cells 13 of each of the cell columns 15 by moving in the longitudinal direction. The dragon DR also moves in the transverse direction to move between cells. Thus, the dragon DR (bonus reel) may move on each of the cells 13 in directions combining the longitudinal direction and the transverse direction in this manner. Moreover, for example, the movement direction of the dragon DR may contain a diagonal direction of the cells 13. Further, various directions such as a rotation direction may be contained in the movement direction of the dragon DR (bonus reel). That is, any movement path containing at least a direction crossing the scroll direction of the virtual reel 16 may be adopted as the movement path of the dragon DR (bonus reel).

Figure 9:
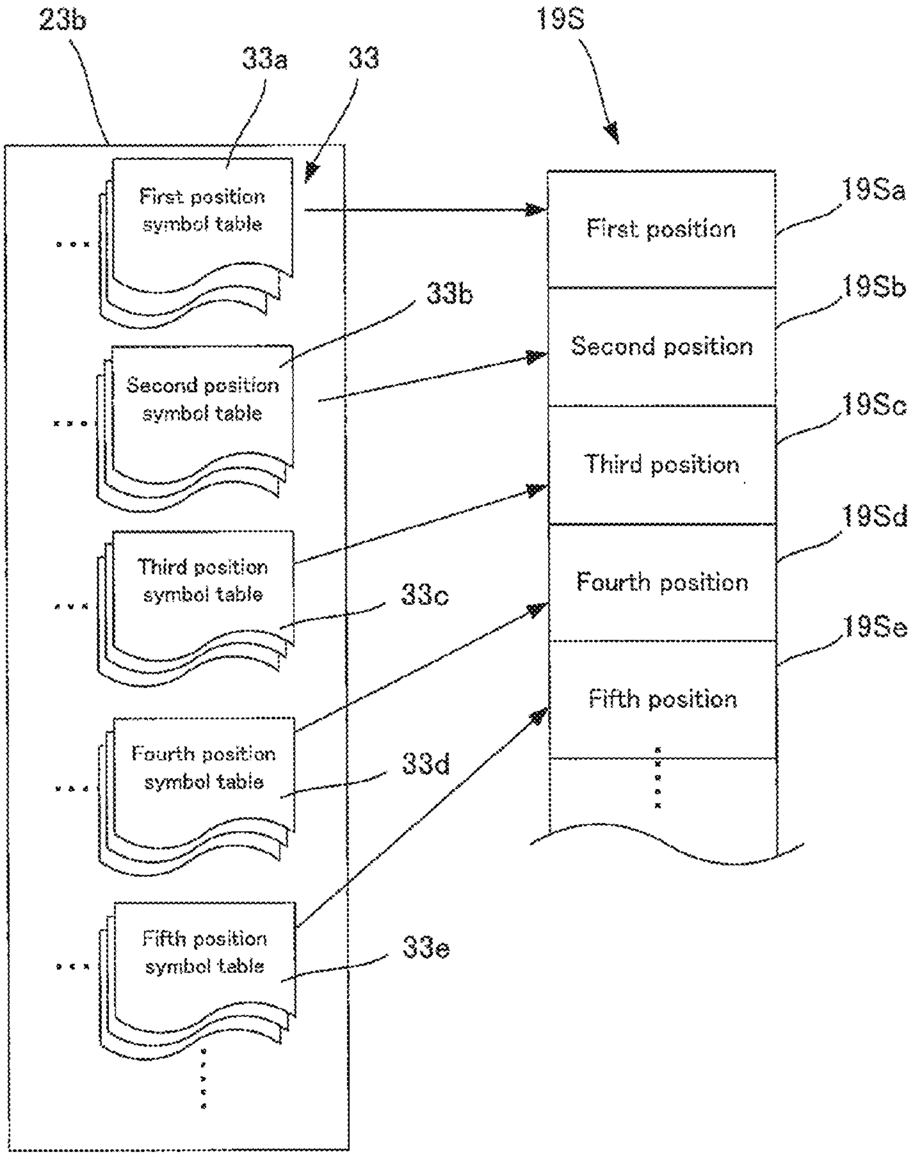
FIG. 9 is a diagram for describing a configuration of lottery data.

Next, details of the lottery data 23*b* will be described with reference to FIGS. 9 and 10. The lottery data 23*b* is used for lottery of the symbol 17 to be arranged in each of the special symbol regions 19S of the bonus reel (dragon DR). FIG. 9 is a diagram for describing a configuration of the lottery data 23*b*. As illustrated in FIG. 9, the lottery data 23*b* contains symbol tables 33 as symbol data. The symbol table 33 is provided for each position of each of the special symbol regions 19S constituting the bonus reel. More specifically, a first position symbol table 33*a* is provided as the symbol table 33 corresponding to the special symbol region 19Sa in the first position of the special symbol regions 19S constituting the bonus reel and a second position symbol table 33*b* is provided as the symbol table 33 corresponding to a special symbol region 19Sb in the second position of it. This also applies to subsequent positions. Moreover, a plurality of tables corresponding to the same position may be provided as the symbol tables 33 for each position such as the first position symbol table 33*a* and the second position symbol table 33*b*.

Figure 10:
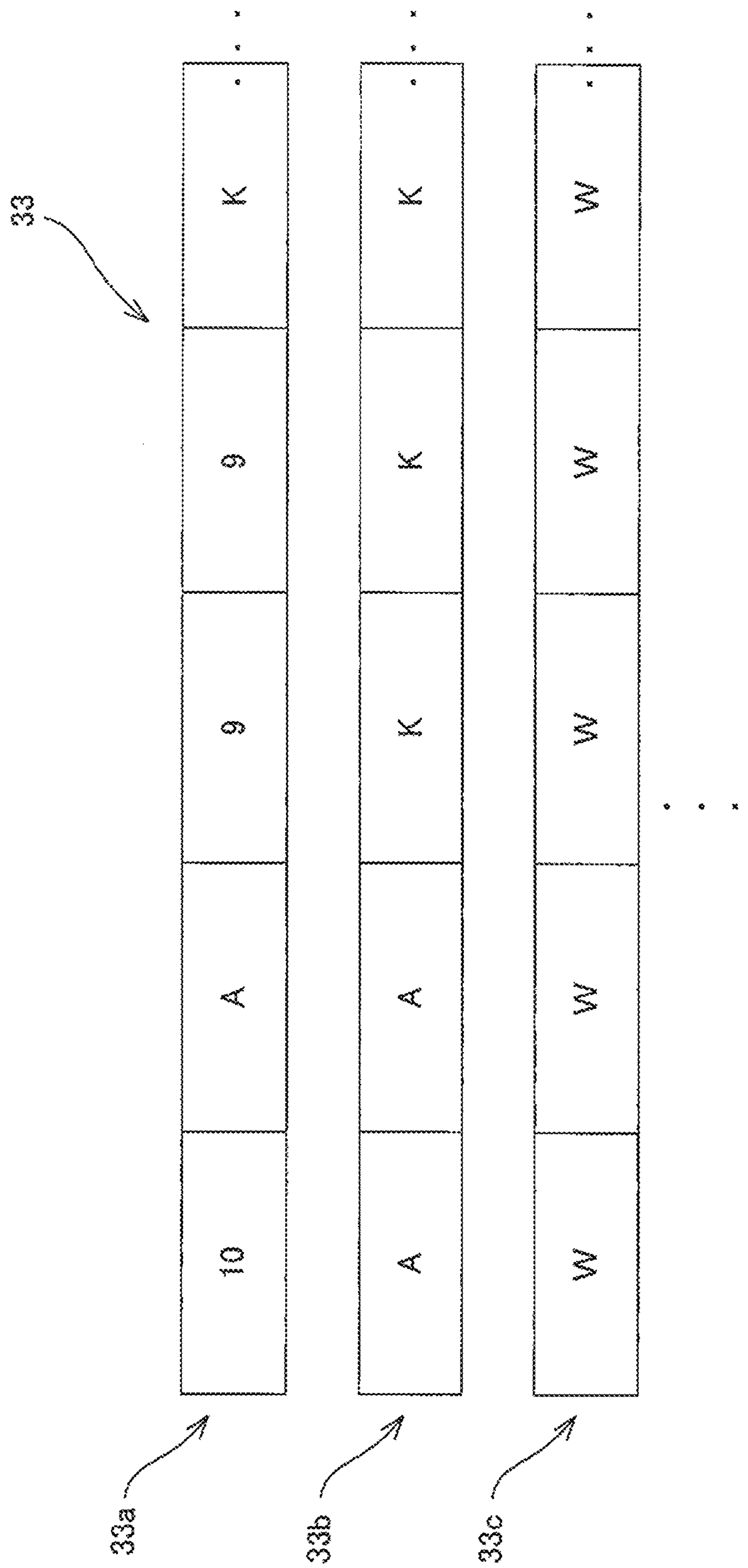
FIG. 10 is a diagram illustrating an example of content of a symbol table.

FIG. 10 is a diagram illustrating an example of content of the symbol table 33. As illustrated in FIG. 10, the symbol table 33 contains information of each of the symbols 17 as a candidate symbol (or information associated with each of the symbols 17). Overlapping information may be contained as information of each of the symbols 17. The information of each of the symbols 17 contained in the symbol table 33 is used for lottery via, for example, a unique number attached to each position. That is, the symbols 17 to be arranged in the special symbol regions 19S are selected by lottery from the information of the symbols 17 contained in the symbol table 33. Therefore, if information of an overlapping symbol 17 exists, the probability that its symbol 17 is arranged in the special symbol region 19S increases.

In the example of FIG. 10, the information of the symbol 17 indicating "9" exists with overlapping in the first position symbol table 33*a*, and information of the symbol 17 indicating "A" and "K" exists with overlapping in the second position symbol table 33*b*. It is assumed, for example, that information corresponding to the 10 symbols 17 is contained in the first position symbol table 33*a* as a whole. Further, the information of the symbols 17 does not exist with overlapping (that is, the information of the symbols 17 is not repeated) other than information of the symbol 17 indicating "9". In such a case, while the probability that any of the other symbols 17 is selected is 1/10, the probability that the symbol 17 of "9" is selected is 2/10. That is, if the first position symbol table 33*a* is used, the probability that "9" is arranged in the special symbol region 19S in the first position is two times greater than the probability that any of the other symbols 17 is arranged. Similarly, if the second position symbol table 33*b* is used, the probability that "A" or "K" is arranged is higher than the probability that any other symbol is arranged. Further, in the example of FIG. 10, information of the symbol 17 contained in the third position symbol table 33*c* is "W" only. This "W" functions as information associated with the symbol 17 functioning as the wild symbol. And, in the example of FIG. 4 or the like, the star figure of "☆" is adopted as the wild symbol. That is, in the example of FIG. 4 or the like, if the third position symbol table 33*c* is used, the symbol 17 of "☆" functioning as the wild symbol is reliably arranged at the third position of the special symbol region 19S.

Thus, as the symbol table 33 for each position, there are prepared the tables having mutually different probabilities that each of the symbols 17 appears. In addition, as the plurality of the symbol tables 33 corresponding to the same position, there may be prepared a plurality of tables having mutually different probabilities of appearance of the symbols 17. The probability of appearance with respect to at least one symbol only needs to be different between the symbol tables 33. Or, the symbol tables may contain symbol tables that all lottery candidates of the symbols are same and at least a portion of the lottery probabilities of each lottery candidates of the symbols differs from each other. In this case, it is possible to realize a lottery that the lottery candidates of the symbols are same and probability of the symbols arranged differs from each other. Herewith, it is possible to realize an arrangement of more various variations. Further, the symbol table 33 may contain information corresponding to the blank state in order to make the special symbol region 19S into the blank state in which none of the symbols 17 are arranged. If, in such a case, the information is selected by lottery, the special symbol region 19S corresponding to the position becomes the blank state. On the other hand, the position to become the blank state may be fixed in advance.

With only the symbol tables 33 used for lottery of each position, it is difficult to adjust the whole symbols 17 of the special symbol regions 19S such as arranging the wild symbol in all the special symbol regions 19S. Thus, in order to fill such a need, the lottery data 23*b* may contain a table capable of adjusting all the symbols 17 to be arranged in each of the special symbol regions 19S. That is, a table in which the arrangement of the whole special symbol regions 19S is determined in advance may be prepared. Also, for example, for at least two positions of the special symbol regions 19S lying next to each other, there may be used symbol tables 33 that the probability choosing same symbols is higher than the probability choosing different symbols from each other. In this case, it is possible to improve the expectation of the prize winning since same symbols are arranged on the two positions lying next to each other. For example, as like this symbol tables 33, there may be used same symbol tables 33 that the probability choosing the wild symbol is high. In addition, the special symbol region 19S with high probability that the same symbol are arrange as the symbols lying next to each other is not limited the embodiment that the symbols lie next to each other on the special symbol region 19S. For example, the lottery with high probability that the same symbol is arranged may be executed as the lottery of special symbol regions 19S lying next to each other when the dragon DR stops, that is, when the symbols of the special symbol regions 19S are arranged on each cell 13.

Figure 11:
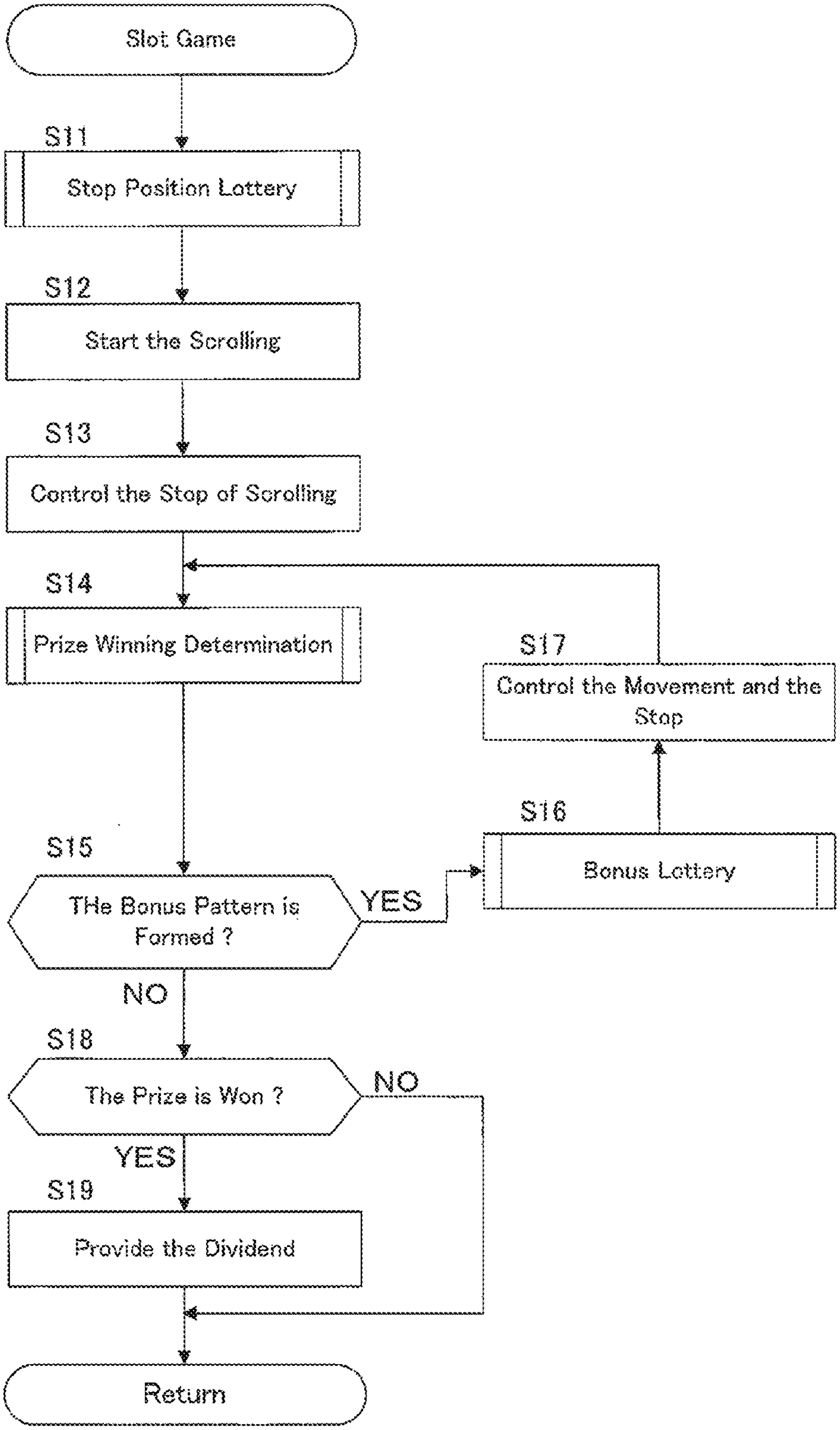
FIG. 11 is a diagram illustrating an example of a flow chart of a slot game routine.

Next, a slot game routine executed by the control unit 20 will be described. FIG. 11 is a diagram illustrating an example of a flow chart of a slot game routine executed by the control unit 20. The control unit 20 executes, for example, the routine in FIG. 11 whenever a game start condition is met. As the game start condition, for example, there may be adopted a condition when coins of a suitable amount are bet or an operation to start a game is performed thereafter.

If a routine of the FIG. 11 is started, in step S11, the control unit 20 executes a subroutine that chooses the stop positions of the virtual reels 16 by the lottery. The contents of this subroutine will be described in detail below. Next, in step S12, the control unit 20 starts the scrolling of each virtual reel 16. Next, in step S13, the control unit 20 stops each virtual reel 16 at the stop position determined in step S11. Then, the control unit 20 proceeds to step S14 and executes a subroutine for the prize winning determination. The contents of this subroutine will be described below.

Next, in subsequent step S15, the control unit 20 determines whether or not the bonus pattern is formed by using the prize winning determination unit 28. More specifically, the control unit 20 determines whether or not the bonus pattern is formed by using a processing result of a subroutine for the prize winning determination. If the determination result thereof is a positive result, that is, if the control unit 20 determines that the bonus pattern is formed, the control unit 20 proceeds to step S16. In step S16, the control unit 20 executes a bonus lottery subroutine to identify the symbols 17 to be arranged in the special symbol regions 19S of the bonus reel and each cell where each of the symbols 17 should be stopped. The content of this subroutine will be described later.

In step S17 that follows, the control unit 20 controls the movement and the stop of the bonus reel. More specifically, the control unit 20 causes the bonus reel in which each symbol is arranged in each of the special symbol regions 19S to appear in a predetermined position and to move on a predetermined movement path along each of the cells 13 based on a processing result of the bonus lottery subroutine. Then, the control unit 20 stops the movement of the bonus reel so that each symbol of the bonus reel is arranged in each of the cells 13 obtained by the processing result of the bonus lottery subroutine. When the process in step S17 is finished, the control unit 20 returns to step S14, and, executes the subsequent processes including step 14.

In contrast, when the result of the determination in the step S15 is a negative result, that is, when the control unit 20 determines that the bonus pattern is not formed, the control unit 20 proceeds to step S18. In step S18, the control unit 20 determines whether or not the prize is won by using the prize winning determination unit 28. Specifically, the prize winning is determined by using the processing result of the subroutine for the prize winning determination. If the determination result of this is negative, the control unit 20 skips subsequent processes, and terminates the present bonus game routine. Meanwhile, if the determination result of this is a positive result, the control unit 20 proceeds to step S19. In step S19, the control unit 20 provides a predetermined dividend according to content of the prize winning, that is, according to the formed prize winning pattern and a number of it, and terminates the present routine. Herewith, the slot game and the bonus game is provided, and the dividend according to its result is provided to the player.

Figure 12:
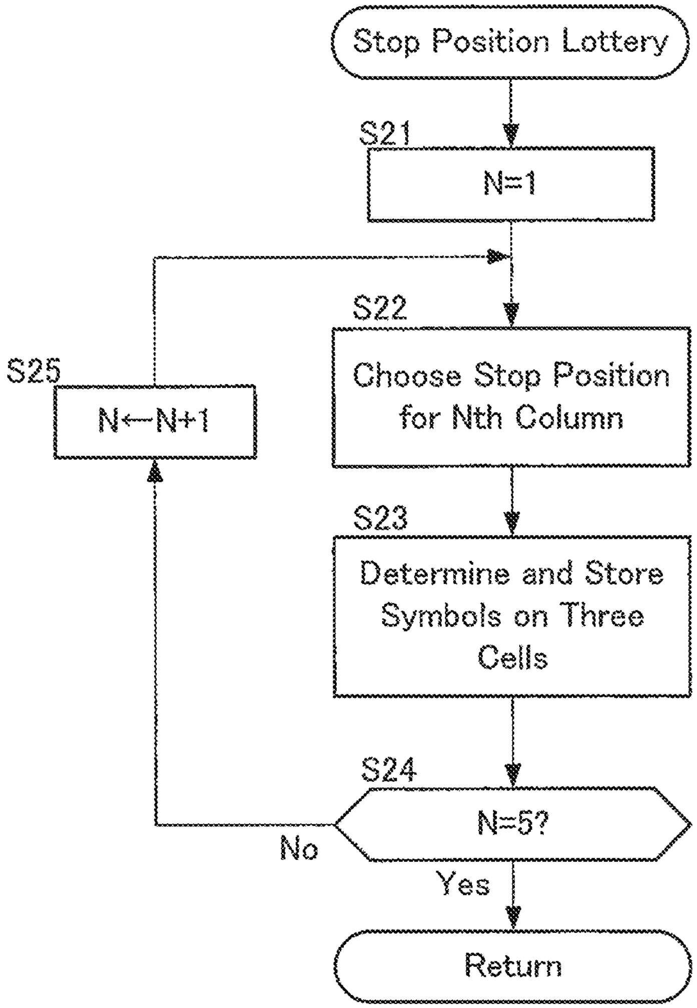
FIG. 12 is a diagram illustrating an example of the flow chart of a stop position lottery routine.

In contrast, FIG. 12 is a diagram illustrating an example of a flowchart of a stop position lottery routine which is executed by the control unit 20. The subroutine of the FIG. 12 is called and executed at step S11 in the routine of the FIG. 12, as a subroutine process with respect to the slot game routine. If the control unit 20 starts the stop position lottery routine of FIG. 12, first, in step S21, an initial value 1 is set to a variable N to specify a column number of the lottery target cell columns 15. In this case, for an example, a number which increases in order of 1, 2 . . . from the column 15 of the left end of the lottery region 12 is used as the column number.

Next, in step S22, the control unit 20 chooses the stop position of the virtual reel 16 in the lottery target cell column (N-th cell column) 15 by the lottery. The lottery is executed so that the lottery unit 27 acquires the random numbers from the random number generator 26. From the lottery result, a relationship between the symbol 17 and cell 13 where the symbols 17 is positioned in which the scroll of the virtual reel 16 needs to be stopped is determined. For example, in the virtual reel 16 of the FIG. 2, when a number is attached to each symbol region 19 from the upper end in the order of 1, 2, . . . , whether the scroll of the virtual reel 16 needs to be stopped when the symbol region 19 of any number is positioned at the cell 13 of the upper end of the cell column 15 can be determined according to the lottery result. If a number of the symbol regions 19 stopped in any cell 13 is determined, numbers of the symbol regions 19 that are stopped in another cells 13 in the same cell column 15 are also determined.

Next, the control unit 20 proceeds to step S23. In step S23, the control unit 20 determines the symbols 17 to be displayed on the three cells 13 which is included in the lottery target cell column 15, referring to the stop position of the virtual reel 16 chosen in step S22 and the arrangement of the symbol 17 specified by the reel data 23*a*. And, the control unit 20 stores the kinds of the symbols 17 to be displayed on the three cells 13 in the main storage device of the control unit 20. Then, the control unit 20 proceeds to step S24.

In step S24, the control unit 20 determines whether or not the variable N reaches 5. If the variable N does not reach 5 yet, the control unit 20 proceeds to step S25. In step S25, the control unit 20 adds 1 to the variable N, and then, returns to the process of the step S22. On the other hand, in step S24, if the variable N reaches 5, the control unit 20 terminates the stop position lottery routine, and returns to the routine of the FIG. 11. By executing the above described subroutine, all symbols 17 to be displayed on the cells 13 are determined, and stored.

Figure 13:
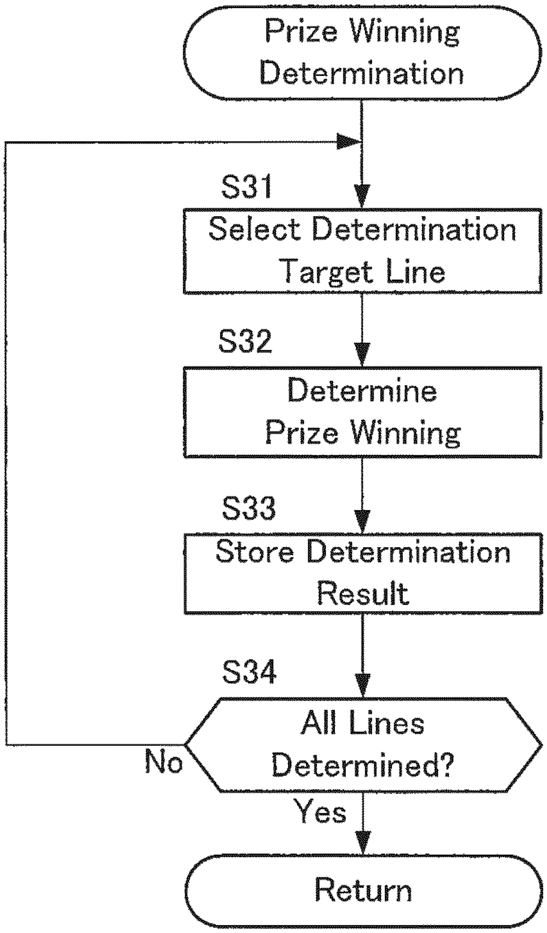
FIG. 13 is a diagram illustrating an example of the flow chart of a prize winning determination routine.

Also, FIG. 13 is a diagram illustrating an example of a flowchart of a prize winning determination routine which is executed by the control unit 20. The subroutine of the FIG. 13 is called and executed at step S14 in the routine of the FIG. 11, as a subroutine process with respect to the slot game routine. This process is executed using the prize winning determination unit 28.

If the prize winning determination routine in FIG. 13 is started, in step S31, the control unit 20 selects one of the prize-winning determination lines HL. The prize-winning determination line HL is appropriately set, as described above, in accordance with the number of bets or the like. In step S32 that follows, the control unit 20 determines whether or not the prize winning is won for the selected prize-winning determination line HL. More specifically, the control unit 20 determines whether or not the prize-winning pattern is formed by each of the symbols 17 arranged in the five cells 13 positioned on the selected prize-winning determination line HL. Further, this determination also includes a determination whether or not the predetermined bonus pattern is formed. That is, in step S32, the control unit 20 determines whether or not the prize-winning pattern is formed and also whether or not the bonus pattern is formed.

Next, in step S33, the control unit 20 stores results of the prize winnings and the bonus determination (including the determination of whether or not the bonus pattern is formed) in step S32 and then, proceeds to step S34. In step S34, the control unit 20 determines whether the determination of the presence or absence of the prize winnings and bonus has been made for all the prize-winning determination lines HL set to the lottery region 12. If the determination result is a negative result, that is, if the non-determined prize-winning determination line remains, the control unit 20 proceeds to step S31, and selects the new prize-winning determination line HL. In addition, if the number of the prize-winning determination lines HL set to the lottery region 12 is one, the determination result in step S34 is always a positive result.

On the other hand, if the determination result in step S34 is a positive result, that is, if the prize winning determinations have been made for all the prize-winning determination lines HL set to the lottery region 12, the control unit 20 terminates the prize winning determination routine this time, and returns to the routine in FIG. 11. Then, in step S15 in FIG. 11, the control unit 20 determines whether or not a bonus pattern is formed based on the determination result stored in step S33 in FIG. 13. Similarly, in step S18 in FIG. 11, there is determined the presence or absence of the prize winnings.

Figure 14:
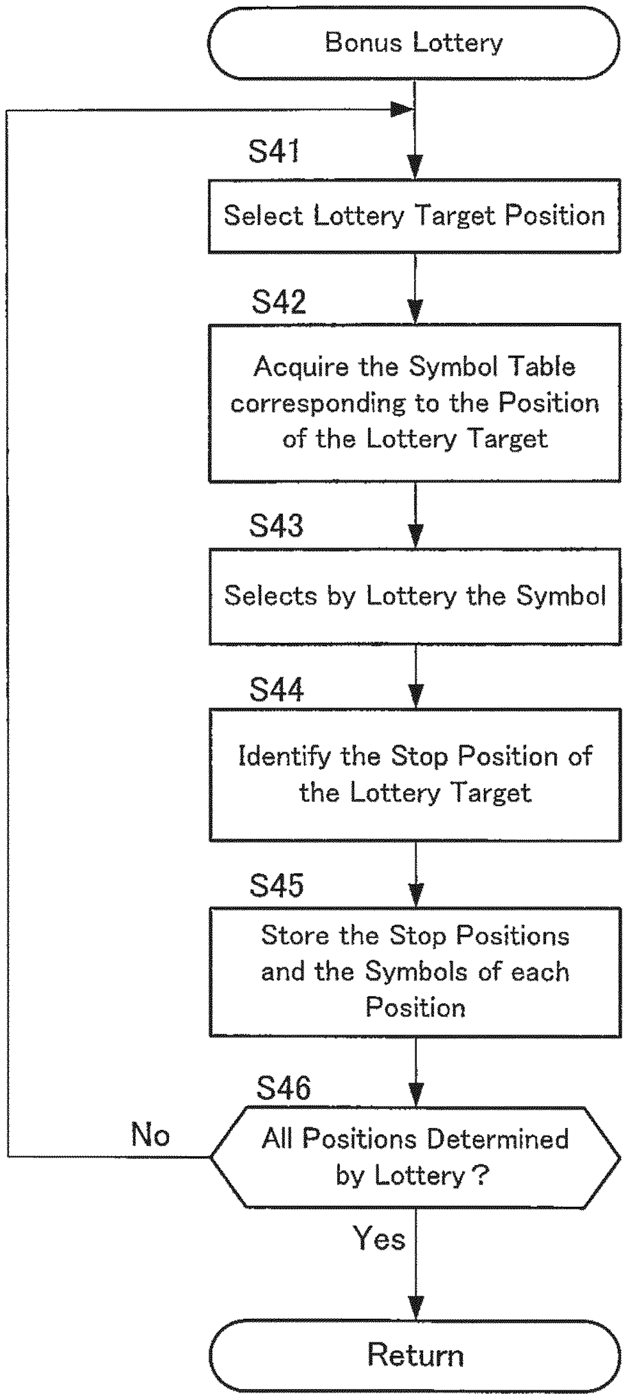
FIG. 14 is a diagram illustrating an example of the flow chart of a bonus lottery routine.

Also, FIG. 14 is a diagram illustrating an example of the flow chart of a bonus lottery routine executed by the control unit 20. The subroutine in FIG. 14 is called and executed at step S16 in FIG. 11 as a subroutine process with respect to the slot game routine.

If the bonus lottery routine in FIG. 14 is started, in step S41, the control unit 20 selects one of the special symbol regions 19S contained in the bonus reel. This selection is executed in sequence, for example, from the front (head of the dragon DR) in the direction of travel of the bonus reel. In addition, if the positions of the special symbol regions 19S change depending on the predetermined condition, in step S41, the control unit 20 may identify the positions where the special symbol regions 19S is arranged based on the predetermined condition. And, in step S41, the selection only has to be executed based on each identified position.

In step S42 that follows, the control unit 20 acquires the symbol table corresponding to the position of the lottery target. More specifically, if, for example, the position of the lottery target is the first position from the front, that is, the lottery target is the special symbol region 19S in the first position from the front, the first position symbol table 33*a* is acquired. In addition, if a plurality of the symbol tables 33 corresponding to one position is prepared, one of the symbol tables 33 may be selected in a predetermined order, by lottery, or the like.

In step S43 that follows, the control unit 20 selects by lottery the symbol 17 to be arranged at the position of a lottery target from the special symbol regions 19S based on the symbol table 33 acquired in step S42. The lottery is executed so that the lottery unit 27 acquires a random number from the random number generator 26. More specifically, the symbol 17 in the symbol table 33 associated with the random number is selected through the random number. Accordingly, the symbol 17 to be arranged (or no arrangement of the symbol 17) at the position of the lottery target in the special symbol region 19S is determined.

In step S44 that follows, the control unit 20 identifies the stop position where the special symbol region 19S of the lottery target should be stopped. That is, the control unit 20 identifies the cell 13 where the symbol 17 arranged in the special symbol region 19S of the lottery target should be arranged. This identification is carried out, for example, as follows. First, the control unit 20 identifies the movement path of the bonus reel. The movement path of the bonus reel is switched, for example, in a predetermined order. That is, a plurality of paths is switched in turn. In such a case, the movement path of the bonus reel is identified based on the predetermined order. Then, the position of the cell where each special symbol regions 19S associated with the identified movement path should be arranged is identified. Accordingly, the stop position of the special symbol region 19S of the lottery target is identified. In addition, the movement path may be determined, like the position of the special symbol region 19S, based on the predetermined condition or by lottery.

In step S45 that follows, the control unit 20 stores the symbol 17 selected by lottery in step S43 and the stop position identified in step S44 in the main storage device. Then, the control unit 20 proceeds to step S46. In step S46, the control unit 20 determines whether the symbols 17 for all the special symbol regions 19S contained in the bonus reel have been selected by lottery. If the determination result is a negative result, that is, the non-selected special symbol region 19S remains, the control unit 20 proceeds to step S41, and selects a new position of the special symbol regions 19S. If the number of the special symbol region 19S contained in the bonus reel is one, the determination result in step S46 is always a positive result.

On the other hand, if the determination result in step S46 is a positive result, that is, if all symbols 17 to be arranged in the special symbol regions 19S contained in the bonus reel have been selected by lottery, the control unit 20 terminates the bonus lottery routine this time, and returns to the routine in FIG. 11. Then, at step S17 of the routine in FIG. 11, the movement display of the bonus reel is started based on the symbols 17 (or the blank state) and the stop positions stored at step S45 of the routine in FIG. 14 and each of the symbols 17 etc. in each of the special symbol regions 19S is stopped at the stop position on the cells.

As described above, according to a game machine in this embodiment, the bonus reel occurs as the bonus game when bonus condition is met. The bonus reel arranges the special symbol region 19S on the symbol region 19 stopped in each of the cells 13. The symbols 17 may be arranged in the arranged special symbol regions 19S, which are used to determine whether any prize is won. That is, the symbol 17 arranged in each of the cells 13 can be changed by using the bonus reel. Accordingly, if the bonus condition is met, changes of each symbol of each cell due to rotation of the virtual reel 16 and changes of each symbol of each cell due to movement of the bonus reel can be combined until the determination of whether any prize is won is executed.

The movement path of the bonus reel changes the direction of travel variedly along the cells 13. And, the movement path of the bonus reel includes directions crossing the rotation direction of the virtual reel 16, that is, the arrangement direction of each cell 13 (the direction along each cell column 15). Thus, it is difficult for a player to predict the position where each of the symbols 17 in the special symbol regions 19S is arranged. That is, the prediction of whether or not the prize is won by the player can be betrayed and therefore, the prediction of the game result can be made more difficult. Accordingly, the player's boredom can be prevented and thus, the interest of the game can thereby be improved.

Further, the symbols 17 arranged in the special symbol regions 19S are determined by lottery using the tables having different lottery probabilities of the symbols 17 for each position. That is, it is difficult to predict each symbol 17 arranged on the special symbol regions 19S in advance. Accordingly, the prediction whether or not the prize is won can be made more difficult. Also, by determining the symbols 17 arranged on the special symbol regions 19S based on the tables that the lottery probabilities differ from each other, positions having higher probabilities that a portion of the symbols 17 will be arranged, or the like can be created. That is, with respect to the probability that each symbol 17 will be arranged, a bias can be provided for each position. Thus, it is possible to cause a bias for each position to an expectation of the player.

In the above embodiment, the control unit 20 functions as a symbol lottery device by executing the routine in FIG. 14 and as a prize winning determination device by executing the routine in FIG. 13. Also, the control unit 20 functions as a symbol arrangement control device by executing the slot game routine in FIG. 11. Moreover, the external storage device 21 functions as a symbol data storage device by storing the lottery data 23*b*.

The present invention is not limited to the above embodiment and can be embodied in suitable embodiment. In the above embodiment, a special symbol column is formed by the special symbol regions 19S being arranged in a row. However, the special symbol column is not limited to such an embodiment. For example, the special symbol column may be formed so that symbols are arranged in two rows or branches off to two rows or more on the way. Alternatively, the special symbol column may be formed by symbols being arranged in a circular shape. Further, the special symbol column is not limited to the embodiment in which a plurality of symbols is contained. That is, the special symbol column may be formed so that the special symbol column contains the only one special symbol region 19S and only one symbol is arranged. And, special symbol column is not limited to the embodiment moving in a fixed arrangement. For example, the symbol column may be transformed from a circular shape into a row on the movement path (for example, in the lottery region). Also, the present invention is not limited to an embodiment that all symbol regions 19S which constitutes the special symbol column and the symbols displayed on it are displayed. For example, only a portion of the symbol regions 19S (including one symbol region 19S) which constitutes the special symbol column and the symbols displayed on it may be displayed. Further, the present invention is not limited to an embodiment that all displayed symbols of the special symbol column changes the symbols on each cell. For example, only a portion of the displayed symbols of the special symbol column may change the symbols on each cell.

In the above embodiment, the game machine 1 contains the display device 3 and the control unit 20, and provides a game opportunity by using the game screen 10, however the present invention is not limited to such a embodiment. A slot game may be realized by using a physical lottery device and physical symbols. Also in this case, for example, there may be provided a physical guidance path capable of guiding a physical special symbol column that lengthens so that a direction crossing the movement direction of the symbol column is included, separately from a physical reel for arranging symbols in each cell. And, this guidance path may be formed so that the direction changes once or more.

In the above embodiment, each of the symbol tables 33 having different lottery probabilities of symbols is used for lottery of symbols to be arranged in the bonus reel. However, the present invention is not limited to such a embodiment. For example, each symbol to be arranged in each of the symbol regions 19 of the virtual reel 16 may be selected by lottery based on each of the symbol tables 33 having different lottery probabilities of symbols. That is, each symbol 17 arranged on each symbol region 19 included in the virtual reel 16 may function as the symbol group of the present invention. In such a case, the range in which the bias can be provided to the expectation of the player can be extended.

Further, in the above embodiment, the selection by lottery having different lottery probabilities of symbols is executed based on the symbol table 33 for each position contained in the lottery data 23*b*. However, the present invention is not limited to such an embodiment. For example, for the lottery having different lottery probabilities of symbols, there may be used a physical lottery device having mutually different lottery probabilities relevant to at least one symbol. Such a lottery may be executed by using, for example, a plurality of physical lottery media groups divided into two groups or more and containing physical lottery media so that lottery probabilities relevant to at least one symbol are mutually different.

What is claimed is:

1. A wagering game machine, comprising:

a display device;

a random number generator;

an accepting device configured to establish a credit balance associated with a monetary value, the credit balance being increasable and decreasable based at least on wagering activity;

a cashout device configured to receive an input to cause an initiation of a payout associated with the credit balance;

a non-transitory memory device having computer-executable instructions stored thereon; and a processor, which upon executing the computer-executable instructions, is configured to:

receive a wager amount for play of a game, the wager amount decreasing the credit balance;

display a lottery region for the game, via the display device, the lottery region including a predetermined number of primary cells arranged in a grid;

randomly establish a plurality of symbols and display a respective symbol in each of the predetermined number of primary cells;

display a moving column, the moving column having a predetermined number of moving column cells;

establish, via the random number generator, for each of the predetermined number of moving column cells a presence of a wild symbol or a null symbol;

display, on the display device, the moving column in a display region outside of the lottery region;

cause the moving column to move from the display region outside of the lottery region and appear in the lottery region on a movement path in a first direction to overlay a first subset of the plurality of primary cells, changing directions to a second direction to overlay a second subset of the plurality of primary cells that have not yet been overlaid by the moving column, and stopping the moving column so that at least the portion of the moving column is arranged on the plurality of primary cells, wherein, when the moving column is stopped, one of the moving column cells is located on a row of the grid and another one of the moving column cells is located on another row of the grid, wherein any wild symbol within one of the moving columns cells replaces a respective symbol in an underlying primary cell on the grid, the moving column and the grid forming an outcome;

determine whether the outcome forms a prize winning pattern;

in response to determining the formation of a prize winning pattern, award a prize value, the prize value increasing the credit balance; and detect the input to cause the initiation of the payout, via the cashout device.

2. The game machine according to claim 1 wherein the processor independently determines a presence of a wild symbol or a null symbol for each of the moving columns cells.

3. The game machine according to claim 2, wherein a probability associated with at least two of the moving column cells differ from each other.

4. The game machine according to claim 1 wherein a probability of at least two adjacent symbols of the moving symbol column being wild symbols is higher than a probability of the at least two adjacent symbols being a wild symbol and a null symbol.

5. The game machine according to claim 1 wherein the moving symbol column includes at least two wild symbols within adjacent moving column cells when the moving column has been arranged on the grid, wherein at least one symbol adjacent to the at least two wild symbols has a higher probability of being another wild symbol than being a null symbol.

6. The game machine according to claim 1 wherein the predetermined number of moving column cells is equal to the predetermined of primary cells.

7. The game machine according to claim 1 wherein the predetermined number of moving column cells is not equal to the predetermined of primary cells.

8. The game machine according to claim 1 wherein the movement path includes alternating between two directions.

9. A method of operating a wagering game machine, the wagering game machine including a display device, a random number generator, an accepting device configured to establish a credit balance associated with a monetary value, the credit balance being increasable and decreasable based at least on wagering activity, a cashout device configured to receive an input to cause an initiation of a payout associated with the credit balance, a non-transitory memory device having computer-executable instructions stored thereon, and a processor, the method comprising the steps of:

receiving, by the processor, a wager amount for play of a game, the wager amount decreasing the credit balance;

displaying, a lottery region for the game, via the display device, the lottery region including a predetermined number of primary cells arranged in a grid;

randomly establishing, by the random number generator, a plurality of symbols and display a respective symbol in each of the predetermined number of primary cells;

displaying, on the display device, a moving column, the moving column having a predetermined number of moving column cells;

establishing, via the random number generator, for each of the predetermined number of moving column cells a presence of a wild symbol or a null symbol;

displaying, on the display device, the moving column in a display region outside of the lottery region;

causing, by the processor, the moving column to move from the display region outside of the lottery region and appear in the lottery region on a movement path in a first direction to overlay a first subset of the plurality of primary cells, changing directions to a second direction to overlay a second subset of the plurality of primary cells that have not yet been overlaid by the moving column, and stopping the moving column so that at least the portion of the moving column is arranged on the plurality of primary cells, wherein, when the moving column is stopped, one of the moving column cells is located on a row of the grid and another one of the moving column cells is located on another row of the grid, wherein any wild symbol within one of the moving columns cells replaces a respective symbol in an underlying primary cell on the grid, the moving column and the grid forming an outcome;

determining whether the outcome forms a prize winning pattern;

in response to determining the formation of a prize winning pattern, awarding a prize value, the prize value increasing the credit balance; and detecting the input to cause the initiation of the payout, via the cashout device.

10. The method according to claim 9 wherein the processor independently determines a presence of a wild symbol or a null symbol for each of the moving columns cells.

11. The method according to claim 10, wherein a probability associated with at least two of the moving column cells differ from each other.

12. The method according to claim 9 wherein a probability of at least two adjacent symbols of the moving symbol column being wild symbols is higher than a probability of the at least two symbols being a wild symbol and a null symbol.

13. The method according to claim 9 wherein the moving symbol column includes at least two wild symbols within adjacent moving column cells when the moving column has been arranged on the grid, wherein at least one symbol adjacent to the at least two wild symbols has a higher probability of being another wild symbol than being a null symbol.

14. The method according to claim 9 wherein the predetermined number of moving column cells is equal to the predetermined of primary cells.

15. The method according to claim 9 wherein the predetermined number of moving column cells is not equal to the predetermined of primary cells.

16. The method according to claim 9 wherein the movement path includes alternating between two directions.

* * * * *